US010187000B2

United States Patent
Borisov et al.

(10) Patent No.: US 10,187,000 B2
(45) Date of Patent: Jan. 22, 2019

(54) VARIABLE SPEED DRIVE WITH ACTIVE CONVERTER

(71) Applicant: JOHNSON CONTROLS TECHNOLOGY COMPANY, Plymouth, MI (US)

(72) Inventors: Konstantin Borisov, York, PA (US); Ivan Jadric, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 79 days.

(21) Appl. No.: 15/148,451

(22) Filed: May 6, 2016

(65) Prior Publication Data

US 2016/0329851 A1 Nov. 10, 2016

Related U.S. Application Data

(60) Provisional application No. 62/158,749, filed on May 8, 2015.

(51) Int. Cl.
*G05B 9/03* (2006.01)
*G01R 21/06* (2006.01)
(Continued)

(52) U.S. Cl.
CPC .............. *H02P 21/50* (2016.02); *H02M 1/32* (2013.01); *H02M 1/4216* (2013.01);
(Continued)

(58) Field of Classification Search
CPC ........ H02M 1/4233; G05B 9/03; G01R 21/06
(Continued)

(56) References Cited

U.S. PATENT DOCUMENTS 4,984,147 A 1/1991 Araki
5,003,252 A 3/1991 Nystrom
(Continued)

FOREIGN PATENT DOCUMENTS

CN 101917130 A 12/2012
EP 0827262 A2 3/1998
(Continued)

OTHER PUBLICATIONS

Burgos et al. "Extended voltage swell ride-through capability for PWM voltage-source rectifiers", IECON'01. Proceedings of the 27th Annual Conference of the IEEE Industrial Electronics Society. Denver, CO, Nov. 29-Dec. 2, 2001;[Annual Conference of the IEEE Industrial Electronics Society[, New York, NY; IEEE, US, vol. 2, Nov. 29, 2001.*

(Continued)

*Primary Examiner* — Eduardo Colon Santana
*Assistant Examiner* — Cortez Cook
(74) *Attorney, Agent, or Firm* — Fletcher Yoder, P.C.

(57) ABSTRACT

A system or method for a VSD with an active converter including a controller, an inductor, an active converter, a DC link, and an inverter. The active converter is controlled to receive an input AC voltage and output a boosted DC voltage to a DC link, up to 850 VDC, the active converter using only low voltage semiconductor switches to provide the 850 VDC DC link voltage. The controller is configured to operate with a reactive input current magnitude equal to zero at a predetermined system load, and at system loads less than the predetermined system load, to introduce a reactive input current that results in a converter voltage having a magnitude less than the input voltage, wherein the vector sum of the input voltage and an inductor voltage is equal to the converter voltage.

16 Claims, 6 Drawing Sheets

(51) Int. Cl.
| | |
|---|---|
| *H02M 1/42* | (2007.01) |
| *H02P 21/00* | (2016.01) |
| *H02P 27/06* | (2006.01) |
| *H02M 1/32* | (2007.01) |
| *H02M 5/458* | (2006.01) |
| *H02M 1/15* | (2006.01) |
| *H02M 1/00* | (2006.01) |

(52) U.S. Cl.
CPC ....... *H02M 1/4233* (2013.01); *H02M 5/4585* (2013.01); *H02P 27/06* (2013.01); *H02M 1/15* (2013.01); *H02M 2001/0025* (2013.01); *Y02B 70/126* (2013.01)

(58) Field of Classification Search
USPC ............................................ 363/37; 318/803
See application file for complete search history.

(56) References Cited

U.S. PATENT DOCUMENTS

| | | | |
|---|---|---|---|
| 5,621,627 | A | 4/1997 | Krawchuk et al. |
| 5,808,880 | A * | 9/1998 | Marvin ............... H02M 1/4233 318/803 |
| 7,413,413 | B2 | 8/2008 | Schnetzka et al. |
| 7,420,351 | B2 | 9/2008 | Grbovic |
| 7,425,806 | B2 | 9/2008 | Schnetzka et al. |
| 9,024,559 | B2 | 5/2015 | Adiga-Manoor et al. |
| 2008/0174257 | A1* | 7/2008 | Schnetzka ............. F25B 49/025 318/434 |
| 2009/0230909 | A1* | 9/2009 | Hiti ...................... H02P 21/0003 318/564 |
| 2014/0118867 | A1* | 5/2014 | Becerra .................... H02H 7/09 361/33 |
| 2014/0254217 | A1* | 9/2014 | Li .......................... G01R 21/06 363/37 |

FOREIGN PATENT DOCUMENTS

| | | |
|---|---|---|
| JP | H01-315266 A | 12/1989 |
| JP | H11-75328 A | 3/1999 |
| JP | 2005-094937 A | 4/2005 |
| JP | 2010-200412 A | 9/2010 |

OTHER PUBLICATIONS

R. P. Burgos et al., "Extended Voltage Swell Ride-Through Capability FO PWM Voltage-Source Rectifiers", IECON'01 Proceedings of the 27th Annual Conference of the IEEE Industrial Electronics Society, 2001, pp. 1119-1124.

Japanese Office Action for JP Application No. 2017-558382 dated Oct. 26, 2018, 5 pgs.

* cited by examiner

VARIABLE SPEED DRIVE WITH ACTIVE CONVERTER

This application claims priority from and the benefit of U.S. Provisional Patent Application No. 62/158,749, entitled VARIABLE SPEED DRIVE WITH ACTIVE CONVERTER, filed May 8, 2015, which is hereby incorporated by reference.

BACKGROUND

The application generally relates to a variable speed drive. The application relates more specifically to a variable speed drive with an active converter, and a control method for improved operating efficiency.

Variable speed drives (VSD) are commonly used for controlling the operating speed of synchronous and asynchronous motors. A VSD includes a converter for converting an AC line input voltage to a DC voltage, a DC link bus with a DC bus and capacitor storage and an inverter to provide variable AC output power to a motor load. The converter may be a passive or active converter. If an active converter is provided, certain benefits can be attained, such as controlling the operating power factor of the motor and associated equipment, and reducing harmonic noise.

The active converter typically includes semiconductor switches, such as IGBTs which switch currents to achieve low harmonic input current and DC bus voltage. The voltage rating of the DC bus is a function of the source input voltage to the VSD and the output voltage that the VSD provides to the motor. In commercial and industrial equipment, higher input and output voltage are required, and IGBT modules rated for 1700 Volts, or high voltage IGBT, are normally required to meet the desired output voltage to drive the motor. Other switches may also be used, including but not limited to MOSFETs, SiC MOSFETs, and GaN transistors. IGBTs rated for 1700 Volts, generate increased switching losses, resulting in reduced efficiency characteristics of the VSDs. By contrast, 1200V IGBT modules, or low voltage IGBT, are characterized by lower switching losses and increased efficiency, but are limited to a lower DC bus voltage.

Currently three different solutions are used to control VSDs. Some applications employ three levels of switches in the VSD converter, which requires twice the number of IGBTs when rated at lower voltages. Low voltage IGBTs may be used in that case, although this method increases the complexity and cost of the VSD. In another solution, a passive front end may be employed, however harmonic currents will be reflected back into the power system and require additional filters at the voltage source to meet the harmonic standards. Lastly, a third approach employs high voltage IGBT modules, resulting in higher losses and additional cost associated with the VSD.

The disclosure provides a method and system to reduce the DC bus voltage of a VSD to accommodate low voltage IGBTs to be used in the VSD while still achieving the DC link voltage sufficient to provide an increased AC voltage output from the inverter.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a VSD with an active converter including a controller, an inductor, a power stage, a DC link, and an inverter. The active converter is controlled to receive an input AC voltage and output a boosted DC voltage. The input voltage may vary from 240V to 635V rms to regulate the DC link up to 850 VDC. The inverter converts this voltage to AC from 0 to 575 Volt. The controller is normally configured to operate with a reactive input current magnitude equal to zero.

Certain advantages of the embodiments described herein include a solution that may be implemented through a strategic software modification to control the active converter to add a reactive current component to the input current of the VSD.

Another advantage of the disclosure is a reduced DC bus operating voltage of the voltage source converters, allowing the use of IGBT modules rated for a lower voltage, e.g., 1200 V, on the input and output ends of the VSD, and lower losses as compared to inefficient high voltage IGBTs.

Still another advantage is increased operating efficiency of the VSD.

Alternative exemplary embodiments relate to other features and combinations of features as may be generally recited in the claims.

DETAILED DESCRIPTION OF THE EXEMPLARY EMBODIMENTS

Figure 1:
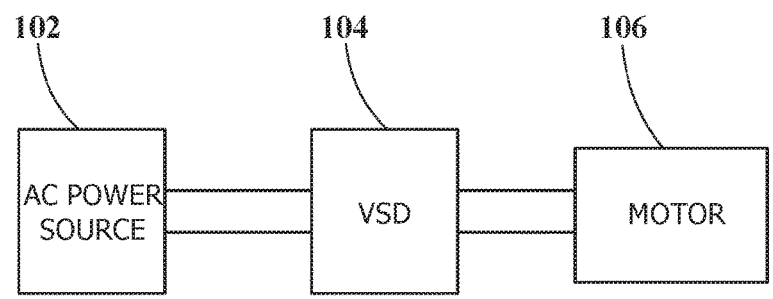
FIG. 1 illustrates schematically a general system configuration of the present invention.
Figure 2:
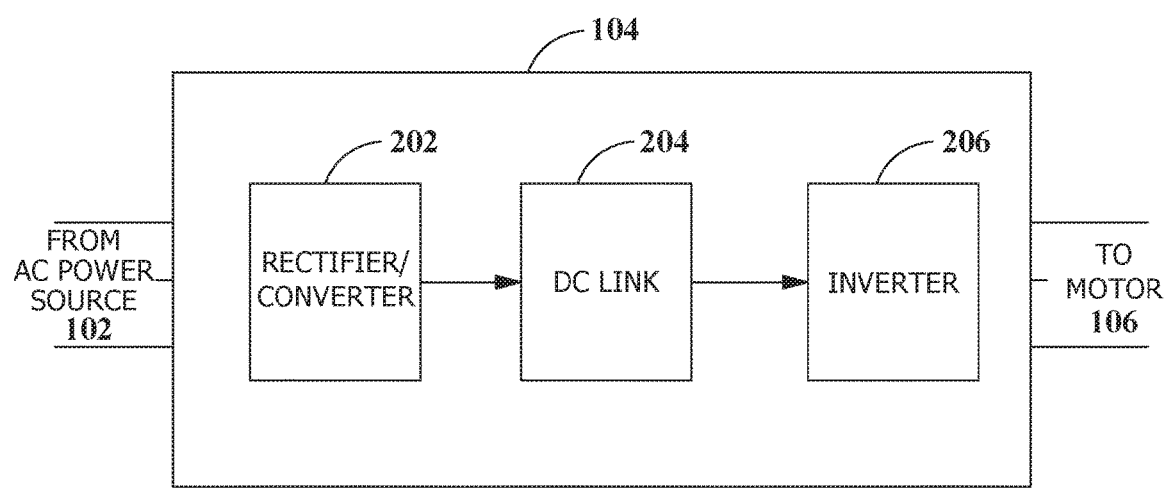
FIG. 2 illustrates schematically an embodiment of variable speed drive of the present invention.

FIGS. 1 and 2 illustrate generally the system configuration of the present invention. An AC power source 102 supplies AC power to the VSD 104, which in turn, supplies AC power to a motor 106. The motor 106 is preferably used to drive a corresponding compressor of a refrigeration or chiller system. The AC power source 102 provides three-phase, fixed voltage, and fixed frequency AC power to the VSD 104 from an AC power grid or distribution system that is present at a site. The AC power grid can be supplied directly from an electric utility or can be supplied from one or more transforming substations between the electric utility and the AC power grid. The AC power source 102 can preferably supply a three phase AC voltage or line voltage of 200 V, 230 V, 380 V, 460 V, or 600 V, at a line frequency of 50 Hz or 60 Hz to the VSD 104 depending on the corresponding AC power grid. It is to be understood that the AC power source 102 can provide any suitable fixed line voltage or fixed line frequency to the VSD 104 depending on the configuration of the AC power grid. In addition, a particular site can have multiple AC power grids that can satisfy different line voltage and line frequency requirements. For example, a site may have 230 VAC power grid to handle certain applications and a 460 VAC power grid to handle other applications.

Referring next to FIG. 2, the VSD 104 receives AC power having a particular fixed line voltage and fixed line frequency from the AC power source 102 and provides AC power to the motor 106 at a desired voltage and desired frequency, both of which can be varied to satisfy particular requirements. Preferably, the VSD 104 can provide AC power to the motor 106 having higher voltages and frequencies or lower voltages and frequencies than the fixed voltage and fixed frequency received from the AC power source 102. FIG. 2 illustrates schematically some of the components in one embodiment of the VSD 104. The VSD 104 can have three stages: a converter 202, a DC link 204 and an inverter 206. The converter 202 converts the fixed line frequency, fixed line voltage AC power from the AC power source 102 into DC power. The DC link 204 filters the DC power from the converter 202 and provides energy storage components such as capacitors 208 and/or inductors (not shown). The inverter 206 converts the DC power from the DC link 204 into variable frequency, variable voltage AC power for the motor 106.

Figure 3:
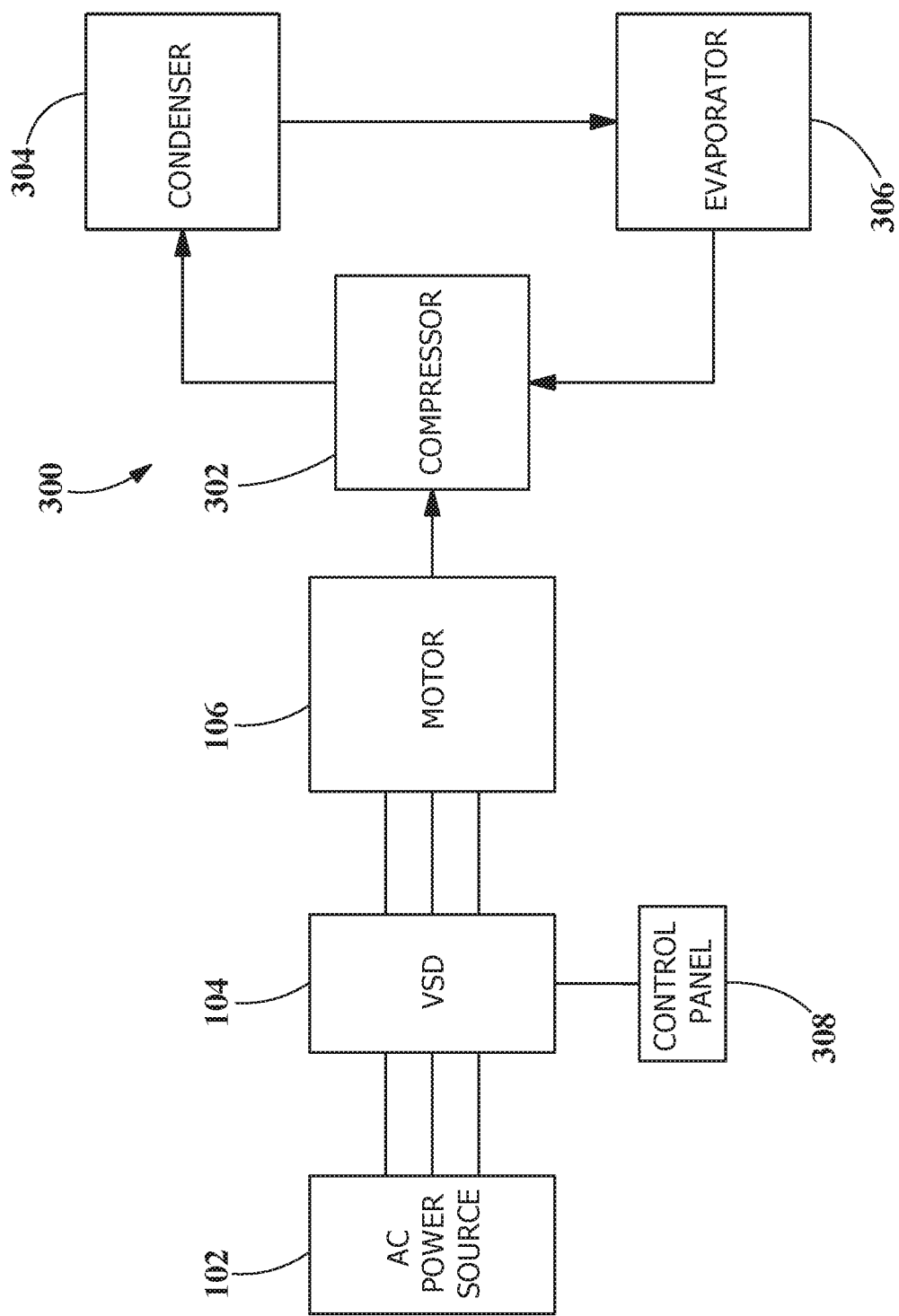
FIG. 3 illustrates schematically a refrigeration system that can be used with the present invention.

The motor 106 may be an induction motor that is capable of being driven at variable speeds. The induction motor can have any suitable pole arrangement including two poles, four poles or six poles. The induction motor is used to drive a load, preferably a compressor of a refrigeration or chiller system as shown in FIG. 3. FIG. 3 illustrates generally the system of the present invention connected to a refrigeration system.

As shown in FIG. 3, the HVAC, refrigeration or liquid chiller system 300 includes a compressor 302, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104 and the motor 106.

Compressor 302 compresses a refrigerant vapor and delivers the vapor to the condenser 304 through a discharge line. The compressor 302 is preferably a centrifugal compressor, but can be any suitable type of compressor, e.g., screw compressor, reciprocating compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to an evaporator 306.

The evaporator 306 can include connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD or multiple VSDs, connected into each of one or more refrigerant circuits.

Preferably, a control panel 308, microprocessor or controller can provide control signals to the VSD 104 to control the operation of the VSD 104 (and possibly motor 106) to provide the optimal operational setting for the VSD 104 and motor 106 depending on the particular sensor readings received by the control panel 308. For example, in the refrigeration system 300 of FIG. 3, the control panel 308 can adjust the output voltage and frequency of the VSD 104 to correspond to changing conditions in the refrigeration system, i.e., the control panel 308 can increase or decrease the output voltage and frequency of the VSD 104 in response to increasing or decreasing load conditions on the compressor 302 in order to obtain a desired operating speed of the motor 106 and a desired load output of the compressor 302.

Referring back to FIG. 2, the converter 202 may be a pulse width modulated (PWM) boost converter or rectifier having insulated gate bipolar transistors (IGBTs) to provide a boosted DC voltage to the DC link 204 to obtain a maximum fundamental RMS output voltage from the VSD 104 greater than the nominal RMS fundamental input voltage of the VSD 104. In a preferred embodiment of the present invention, the VSD 104 can provide a maximum output voltage that is greater than the fixed nominal fundamental RMS input voltage provided to the VSD 104 and a maximum fundamental RMS output frequency that is greater than the fixed input frequency provided to the VSD 104. Furthermore, it is to be understood that the VSD 104 can incorporate different components from those shown in FIG. 2 so long as the VSD 104 can provide the motor 106 with appropriate output voltages and frequencies.

Figure 4:
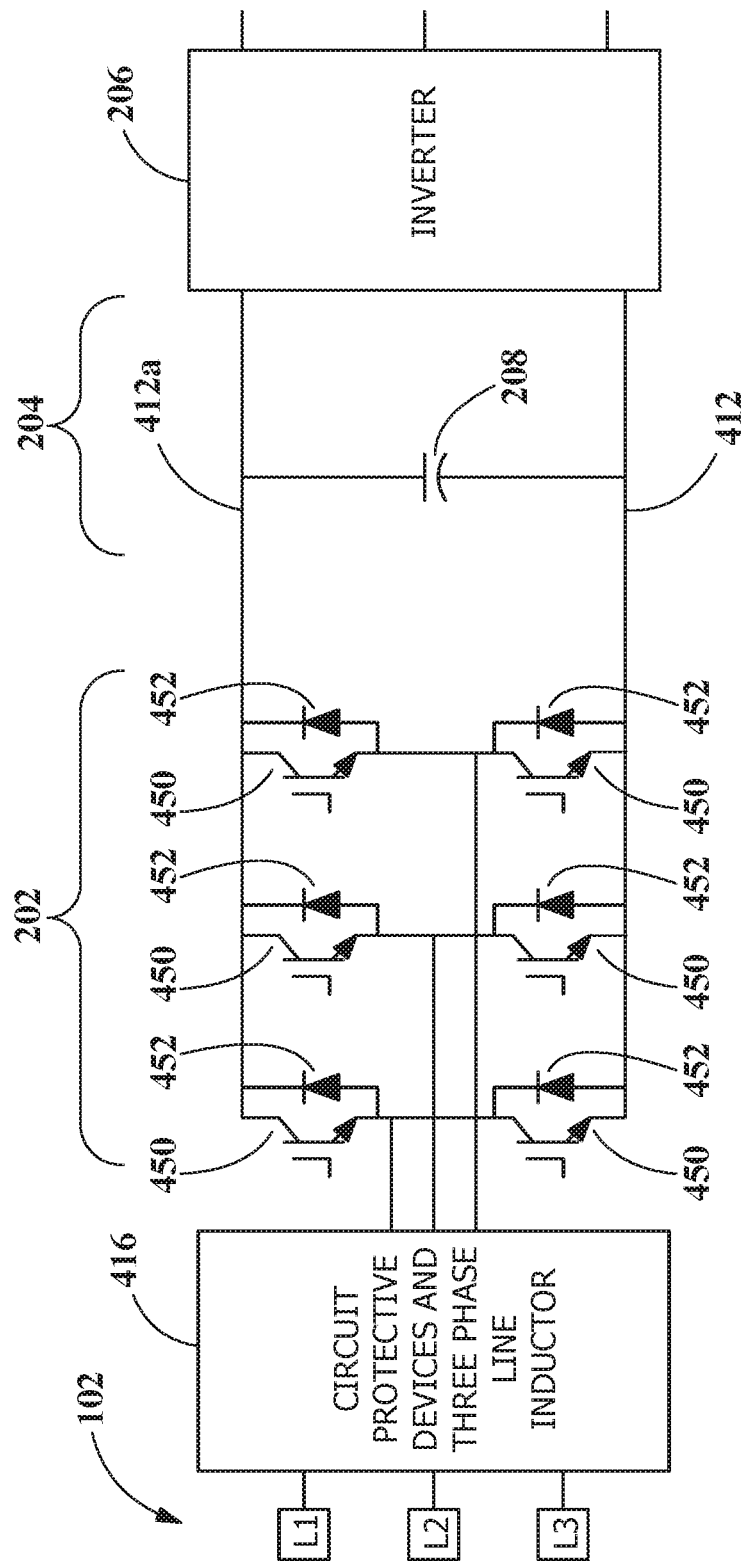
FIG. 4 illustrates an exemplary embodiment of an active converter arrangement.

Referring next to FIG. 4, one embodiment of the active converter or rectifier module 202 is shown. One of the power switches in each pair of power switches is an IGBT 450 connected to an inverse or anti-parallel diode 452. The inverse or anti-parallel diode 452 is used to conduct current after the other power switch, IGBT 450, is turned off when the VSD 104 is operated in a pulse width modulation mode. The IGBTs 450 and inverse diodes 452 are connected between the output of the circuit protective devices and three-phase line inductor 416 and the negative rail of the DC bus 412. However, in another embodiment of the present invention, a multiplicity of IGBTs 450 and inverse diodes 452 can be connected between the output of the circuit protective devices and three-phase line inductor 416 and the positive rail of the DC bus 412*a*, as shown in FIG. 4. Circuit protective devices 416 may include inductors, circuit breakers, fuses and other apparatus for protecting the VSD circuit components connected to the load side of the devices 416.

Figure 5:
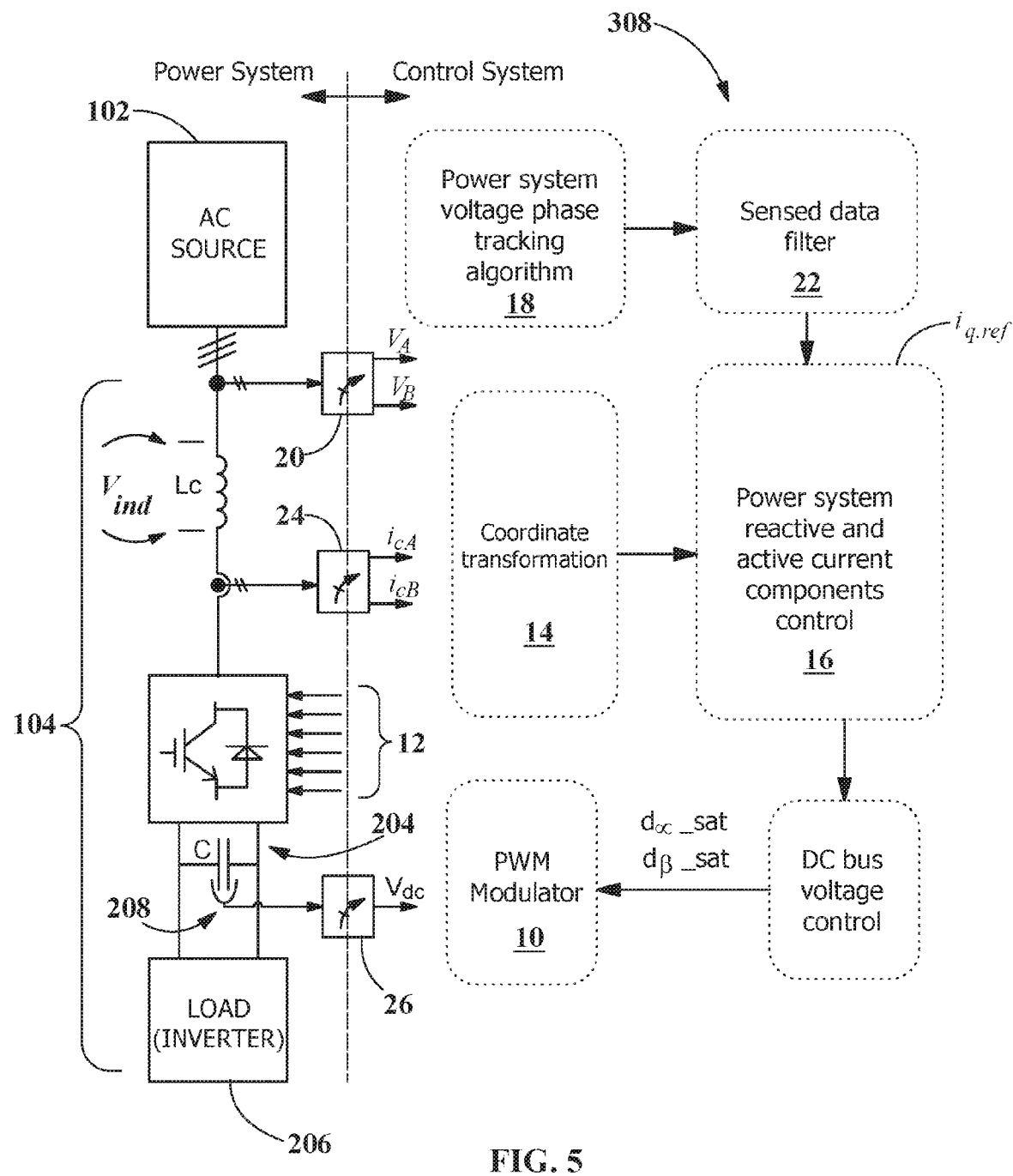
FIG. 5 illustrates an exemplary PWM switching network for implementing an active converter with reduced voltage semiconductor switches.

Referring next to FIG. 5, a pulse width modulation technique is implemented in the converter 202 by controller 308 to provide a three-phase boost rectifier. Closed loop control of the three-phase PWM boost rectifier may be implemented in a digital signal processor (DSP) located in the controller. For one exemplary embodiment of a PWM control method, see, e.g., "Modeling and Control of Three-Phase PWM Converters," Silva Hiti, Ph. D. Dissertation, Virginia Polytechnic Institute and State University, Blacksburg, Va. 1995.

The power stage of a three-phase boost rectifier/converter 202 includes a three-phase switching network. This switching network requires six PWM gating signals 12 generated by a PWM modulator 10. PWM modulator 10 generates the gate signals 12 based on the inputs ($d_q$ and $d_d$) provided by the boost rectifier's control loops. Boost rectifier operation may be enabled after the semiconductor pre-charge devices are gated continuously on or a supply contactor (not shown) is closed for converters without auxiliary IGBTs. In one embodiment, PWM modulator 10 receives the signals $d_{\alpha\_sat}$, and $d_{\beta\_sat}$. Signals $d_{\alpha\_sat}$ and $d_{\beta\_sat}$ are obtained from a coordinate transformation 14 using transformations from a Cartesian coordinate system to a polar coordinate system. Gating signals 12 may be represented by the variables $g_{ap}$, $g_{an}$, $g_{bp}$, $g_{bn}$, $g_{cp}$, and $g_{cn}$, where $g_{xy}$ represents the respective gating signal, x indicates the phase of the rectifier, and y indicates whether it is a gating signal for an IGBT connected to the positive dc rail (p) or the negative dc rail (n).

The PWM modulator method may be selected based on the VSD size and full load ampere (FLA) setting. If FLA is lower than a predetermined threshold the PWM modulator may be continuous space vector modulation; if FLA is greater than or equal to the predetermined threshold, a discontinuous space vector modulation may be applied. The PWM modulator operating in overmodulation mode may also be used to achieve stable DC bus voltage at higher input power line voltage which extends the stability range of the VSD.

The PWM modulator utilizes space vector modulation (SVM). In SVM, $d_{\alpha\_sat}$ and $d_{\beta\_sat}$ are defined as a real and an imaginary part of a vector d in a complex plane ($d_\alpha + j \cdot d_\beta$). Gating signals $g_{ap}$, $g_{an}$, $g_{bp}$, $g_{bn}$, $g_{cp}$, and $g_{cn}$ are then generated based on the magnitude and phase of d. SVM operates on an up-down counter whose frequency is the boost rectifier's switching frequency. The period of the counter is the switching period, or switching cycle, $T_{sw}$, of the rectifier. One half of the switching period $T_{sw}$ is the sampling period, $T_{smp}$. In each sampling period, the gating signals $g_{ap}$, $g_{an}$, $g_{bp}$, $g_{bn}$, $g_{cp}$, and $g_{cn}$ are determined for the sampling period that follows.

Control system 308 also includes a power system voltage phase tracking algorithm 18, which senses input voltage $v_A$ and $v_B$ at sensing module 20. Input current is sensed at sensing module 24, and voltage on the DC link is sensed at sensing module 26. Sensed data filters 22 are applied to input voltages and currents and transformed into the desired format, e.g., from Cartesian coordinates, or abc, into polar coordinates, or stationary dq coordinates, also referred to as d-channel and q-channel voltages and currents.

In order to achieve unity power factor, conventional PWM controllers match the phase of the active converter line current to the phase of the source voltage. In order to accomplish unity power factor, the reference current $i_{q\_ref}$ is set to zero in the current sensing loop of the power system reactive and active current components controls module 16. Active converter 202 is configured to provide a boosted DC voltage on the DC link, to 850 V. At 635V power supply input voltage at full load operation, the converter is able to operate within the rated limit for semiconductor switches rated at 1200 V and still maintain stable DC link voltage of, for example, 850 VDC. This is normally due to the voltage drop across the power supply impedance. However, at reduced loads, in order to maintain the inverter output at acceptable voltage levels, the DC bus voltage must be increased to 870 VDC, which under the conventional operating parameters would require a higher rated voltage—i.e., 1700 V—for the semiconductor switches.

In order to maintain the same output voltage and regulate the DC link at a maximum of 850 VDC, the reference current $i_{q\_ref}$ may be set to a non-zero magnitude, or value, adding a reactive component to the current through the three phase switching network 16.

Figure 6:
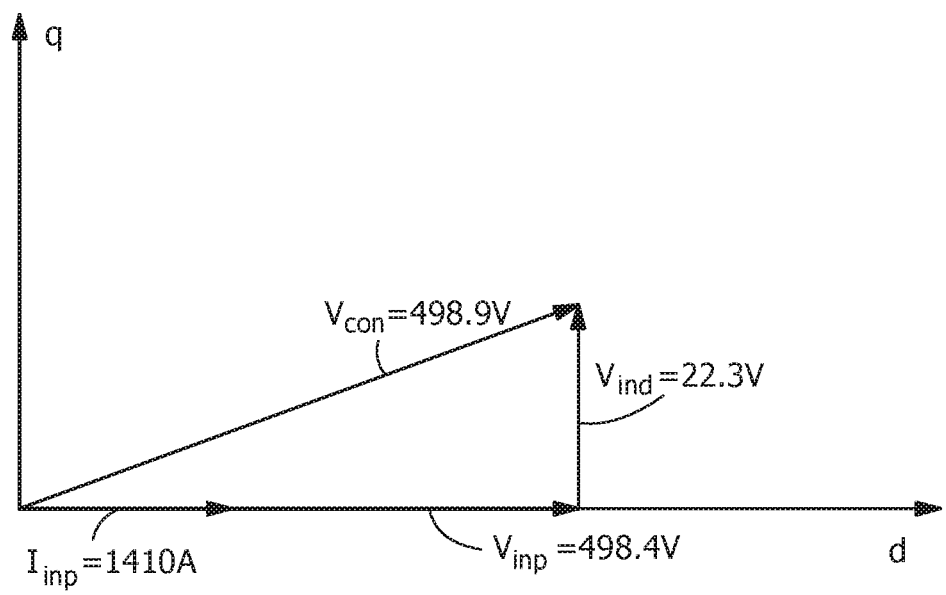
FIG. 6 is a vector representation of an exemplary VSD operation at full load.
Figure 7:
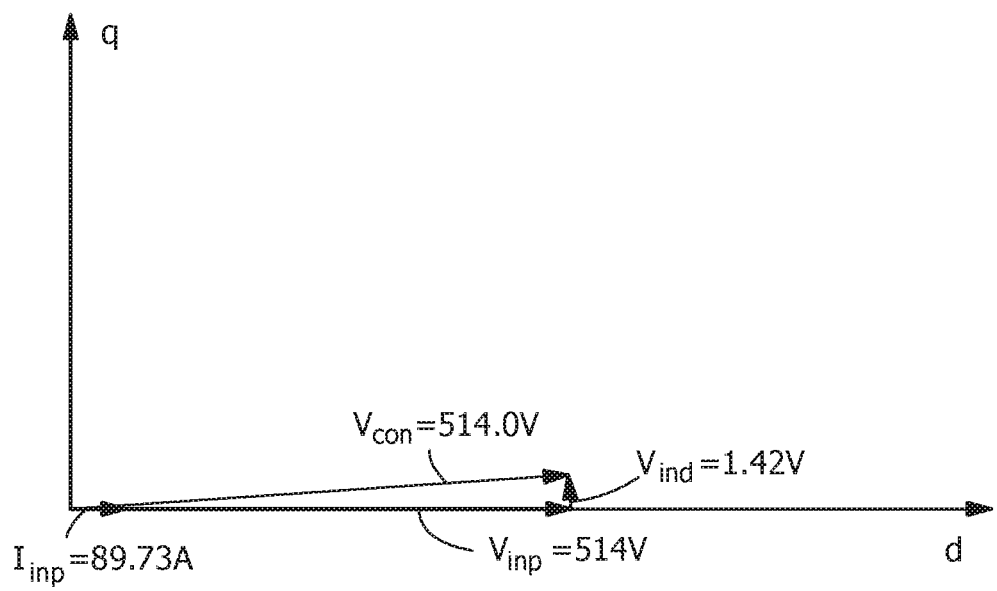
FIG. 7 is a vector representation of VSD an exemplary operation at light load.

FIGS. 6 and 7 illustrate vector representations for VSD operation at 635V input rms line voltage, full load (FIG. 6) and at light or reduced loads (FIG. 7), respectively. In FIG. 6, with the VSD operating at or near full load, a DC bus voltage of 850 VDC is attainable using overmodulation techniques, while maintaining a stable operation of VSD 104. FIG. 6 shows exemplary full load parameters, with the VSD operating at a full load current of approximately 1410 amperes. The AC source voltage ($V_{inp}$) 102 applied to inductor $L_c$ is 498.4V phase voltage peak. The voltage drop ($V_{ind}$) across inductor $L_c$ is 22.3V phase voltage peak, with a phase angle that is orthogonal to the input voltage vector ($V_{inp}$), and the sum of the vectors $V_{inp}$ and $V_{ind}$ yields the converter voltage $V_{conv}$, of 498.9 phase voltage peak. The converter voltage of 498.9 volts is thus achievable in the example shown in FIG. 6, using PWM overmodulation technique. Thus at full load operation the VSD maintains stable operation.

Referring next to FIG. 7, in this example VSD 104 is operating at a light load, e.g., 89.73 amperes of input current. To control the DC link at 850 VDC, $V_{inp}$ is 514V peak, and $V_{ind}$ is 1.42V peak. Thus, $V_{conv}$ must be 514V peak, a magnitude that is not achievable with or without overmodulation. For $V_{conv}$ to be controlled to 514 V, the DC bus voltage must be increased to 870 VDC, which would normally require semiconductor switches rated at 1700V to be used to achieve acceptable reliability. Since 1700V semiconductor switches are not desirable for the VSD application, an alternative method is disclosed for achieving the desired operating parameters.

Figure 8:
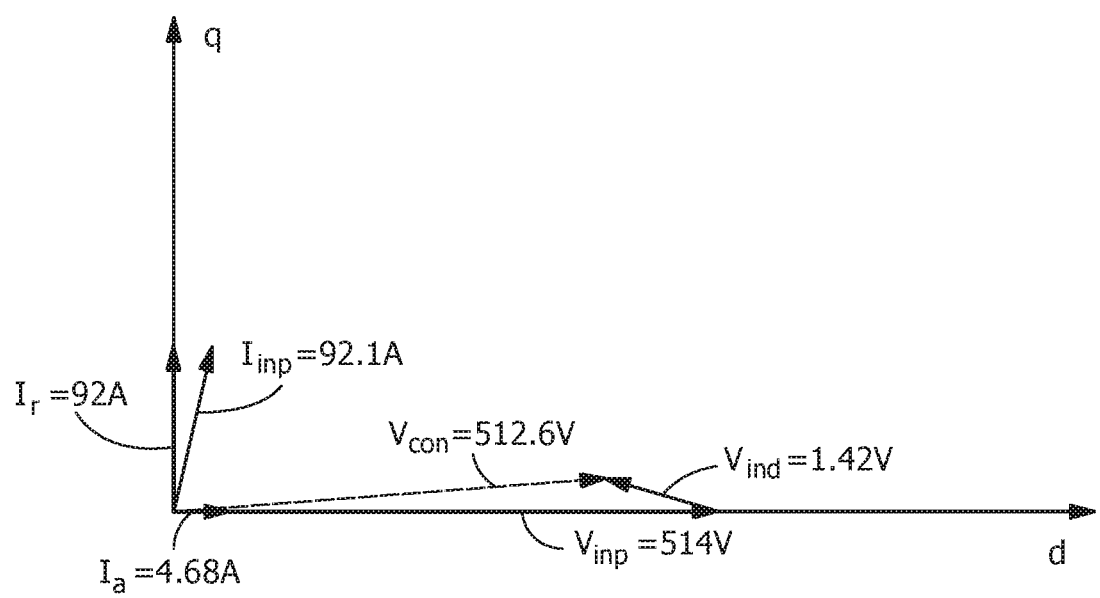
FIG. 8 is a vector representation of VSD operation at light load with reactive current inserted into the PWM modulation algorithm.

Referring to FIG. 8, to achieve stable converter operation at 850V DC bus voltage, the reactive current may be introduced which lowers the required converter voltage ($V_{conv}$) to the value achievable with 850V DC bus. The voltage vector $V_{ind}$ across the inductor and $V_{imp}$ yield the required converter voltage vector ($V_{conv}$). With reactive current added to the system, the vector sum of the input inductor and input line voltages yields lower $V_{conv}$ voltage (See FIG. 8). In the example shown in FIG. 8, adding a reactive current component, Ir, of 92 amperes, $V_{ind}$ is phase shifted by an angle that is 90° with respect to the current vector ($I_{total}$), which results in $V_{conv}$ of 512.6V achievable with 850V DC bus. The reactive current component of $I_{inp}$ is produced by inserting a predetermined magnitude of the reference current for the quadrature current ($i_{q\_ref}$) in the controller, that produces the desired phase shift Θ for $V_{ind}$.

The control system 308 monitors the DC ripple on the DC link voltage as an indication of the stability of the variable speed drive 104. When the load on the variable speed drive is high, the ripple on the DC link voltage is relatively small and the variable speed drive system is stable as indicated in the description of FIGS. 6 through 8. When the load on the variable speed drive is high and decreasing, the ripple on the DC link voltage will eventually exceed a predetermined threshold ripple. The power system reactive and active current components control 16 begins to inject reactive current to stabilize the DC link voltage. Further load decreases result in the ripple on the DC link voltage eventually exceeding the predetermined threshold ripple, necessitating a further increase of reactive current being injected by the power system reactive and active current components control 16 to stabilize the DC link voltage and thus stability of the variable speed drive 104.

Conversely, when the load on the variable speed drive 104 is low and increasing, when the DC ripple at a level of injected reactive current decreases below a second predetermined threshold ripple, the second predetermined threshold ripple being less than the predetermined threshold ripple, the power system reactive and current components control 16 reduces the magnitude of injected current. This process may occur in a sequence of steps until an injected reactive current is no longer required to maintain stability of the DC link voltage and thus stability of the variable speed drive. See the description of FIGS. 6 through 8 relating to the operation of variable speed drive 104.

While an exemplary version of PWM is disclosed above, the disclosed methods and systems are not limited to a particular PWM method. Other PWM methods are disclosed in "A Comparative Study of Control Techniques for PWM Rectifiers in AC Adjustable Speed Drives", M. Malinowski et al., IEEE Transactions on Power Electronics, Vol. 18, No. 6 (November 2003).

It should be understood that the application is not limited to the details or methodology set forth in the description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the variable speed drive as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:
1. A variable speed drive, comprising:
an inductor configured to be electrically coupled to an alternating current power source;
an active converter electrically coupled to the inductor, wherein the active converter is configured to convert input alternating current electrical power received from the inductor into first direct current electrical power that comprises a direct current voltage;
a direct current (DC) link electrically coupled to the active converter, wherein the DC link is configured to:
store electrical energy based at least in part on the first direct current electrical power received from the active converter; and
output second direct current electrical power by filtering the direct current voltage using the electrical energy stored by the DC link;
an inverter electrically coupled to the DC link, wherein the inverter is configured to convert the second direct current electrical power received from the DC link into output alternating current electrical power to be supplied to an electrical load; and
a control system communicatively coupled to the active converter, wherein the control system is configured to:
determine a DC link voltage present on the DC link; and
output control signals that control operation of the active converter to:
maintain the DC link voltage below a DC link voltage threshold;
introduce a first non-zero reactive current when the control system determines that magnitude of a ripple on the DC link voltage exceeds a first ripple threshold; and
introduce a second non-zero reactive current when control system determines that magnitude of the ripple on the DC link voltage exceeds a second ripple threshold, wherein magnitude of the second non-zero reactive current is greater than magni- tude of the first non-zero reactive current when the second ripple threshold is greater than the first ripple threshold.

2. A variable speed drive as recited in claim 1, comprising a sensing module electrically coupled to the DC link and communicatively coupled to the control system, wherein:
the sensing module is configured to output sensed data indicative of the DC link voltage; and
the control system is configured to determine the DC link voltage based at least in part on the sensed data.

3. The variable speed drive of claim 1, wherein the DC link voltage threshold is 850 volts DC.

4. The variable speed drive of claim 1, wherein the active converter is implemented as a pulse width modulated rectifier.

5. The variable speed drive of claim 4, wherein the active converter is configured to operate in an overmodulation mode.

6. The variable speed drive of claim 1, wherein the output alternating current electrical power comprises an alternating current voltage.

7. The variable speed drive of claim 1, wherein the active converter comprises a plurality of solid state switching devices.

8. A variable speed drive system, comprising:
a closed refrigerant loop, wherein the closed refrigerant loop comprises a compressor, a condenser, and an evaporator;
a motor mechanically coupled to the compressor;
a variable speed drive electrically coupled to the motor, wherein the variable speed drive comprises:
an inductor configured to be electrically coupled to an alternating current power source;
an active converter electrically coupled to the inductor, wherein the active converter is configured to convert input alternating current electrical power received from the inductor into first direct current electrical power that comprises a direct current voltage;
a direct current (DC) link electrically coupled to the active converter, wherein the DC link is configured to:
store electrical energy based at least in part on the first direct current electrical power received from the active converter; and
output second direct current electrical power by filtering the direct current voltage using the electrical energy stored by the DC link;
an inverter electrically coupled to the DC link, wherein the inverter is configured to convert the second direct current electrical power received from the DC link into output alternating current electrical power to be supplied to an electrical load; and
a controller communicatively coupled to the active converter, wherein the controller is configured to:
determine a DC link voltage present on the DC link; and
output control signals that control operation of the active converter to:
maintain the DC link voltage below a DC link voltage threshold;
introduce a first non-zero reactive current when the controller determines that magnitude of a ripple on the DC link voltage exceeds a first ripple threshold; and
introduce a second non-zero reactive current when controller determines that magnitude of the ripple on the DC link voltage exceeds a second ripple threshold, wherein magnitude of the second non-zero reactive current is greater than magnitude of the first non-zero reactive current when the second ripple threshold is greater than the first ripple threshold.

9. A variable speed drive system of claim 8, comprising a sensing module electrically coupled to the DC link and communicatively coupled to the controller, wherein:
the sensing module is configured to output sensed data indicative of the DC link voltage; and
the controller is configured to determine the DC link voltage based at least in part on the sensed data.

10. The variable speed drive system of claim 8, wherein the DC link voltage threshold is 850 volts DC.

11. The variable speed drive system of claim 8, wherein the active converter is implemented as a pulse width modulated rectifier.

12. The variable speed drive system of claim 11, wherein the active converter is configured to operate in an overmodulation mode.

13. The variable speed drive system of claim 8, wherein:
the output alternating current electrical power comprise an alternating current voltage; and
the active converter comprises a plurality of solid state switching devices.

14. A method for operating a variable speed drive, comprising:
instructing, using at least one processor, an active converter to convert input alternating current electrical power received from an inductor electrically coupled between the active converter and an alternating current power source into first direct current electrical power supplied to a DC link;
instructing, using the at least one processor, an inverter electrically coupled to the DC link to convert second direct current electrical power received from the DC link into output alternating electrical power supplied to an electrical load; and
determining, using the at least one processor, a DC link voltage based at least in part on sensed data received from a sensing module electrically coupled to the DC link;
determining, using the at least one processor, whether magnitude of a ripple on the DC link voltage exceeds a first ripple threshold; and
determining, using the at least one processor, whether magnitude of a ripple on the DC link voltage exceeds a second ripple threshold;
wherein instructing the active converter to convert the input alternating current electrical power into the first direct current electrical power comprises:
instructing the active converter to generate the first direct current electrical power with a direct current voltage that facilitates maintaining the DC link voltage below a DC link voltage threshold;
instructing the active convert to introduce a first non-zero reactive current when the magnitude of the ripple on the DC link voltage exceeds a first ripple threshold; and
instructing the active convert to introduce a second non-zero reactive current reactive current when magnitude of the ripple on the DC link voltage exceeds the second ripple threshold.

15. The method of claim 14, wherein magnitude the second non-zero reactive current is greater than magnitude of the first non-zero reactive current when the second ripple threshold is greater than the first ripple threshold.

16. The method of claim 14, wherein the DC link voltage threshold is 850 volts DC.

\* \* \* \* \*